United States Patent
Zivi et al.

(10) Patent No.: US 9,847,632 B2
(45) Date of Patent: Dec. 19, 2017

(54) CABLE TERMINATION METHOD AND APPARATUS

(71) Applicants: Daniel F. Zivi, Severna Park, MD (US); David W. Kinnard, Olney, MD (US)

(72) Inventors: Daniel F. Zivi, Severna Park, MD (US); David W. Kinnard, Olney, MD (US)

(73) Assignee: Northrup Grumman Systems Corporation, Falls Church, VA (US)

( * ) Notice: Subject to any disclaimer, the term of this patent is extended or adjusted under 35 U.S.C. 154(b) by 233 days.

(21) Appl. No.: 14/951,262

(22) Filed: Nov. 24, 2015

(65) Prior Publication Data
US 2017/0149231 A1     May 25, 2017

(51) Int. Cl.
*F16G 11/05*     (2006.01)
*H02G 15/007*     (2006.01)
*F16G 11/02*     (2006.01)

(52) U.S. Cl.
CPC ........... *H02G 15/007* (2013.01); *F16G 11/02* (2013.01)

(58) Field of Classification Search
CPC .. H02G 15/007; H02G 15/02; Y10T 24/3909; Y10T 24/3973; Y10T 24/47; Y10T 24/4791; Y10T 24/4764; Y10T 403/37; Y10T 74/2102; Y10T 403/4908; Y10T 403/7054; Y10T 24/38; F16G 11/048; F16G 11/05; E04C 5/122
See application file for complete search history.

(56) References Cited

U.S. PATENT DOCUMENTS

| | | | | |
|---|---|---|---|---|
| 110,422 | A * | 12/1870 | Beau | F16G 11/04 403/314 |
| 3,475,795 | A * | 11/1969 | Youngblood | F16G 11/05 174/135 |
| 4,160,609 | A * | 7/1979 | Jackson | E21D 11/22 403/309 |
| 2012/0042481 | A1 * | 2/2012 | Kempf | H02G 1/06 24/116 R |

* cited by examiner

*Primary Examiner* — Jack W Lavinder
(74) *Attorney, Agent, or Firm* — Tarolli, Sundheim, Covell & Tummino LLP

(57) ABSTRACT

A cable termination system and method include providing an outer socket having a frustum shaped socket interior tapering from a base to a top opening. The outer socket is comprised of two semicircular socket pieces, each forming a portion of a complete circumference of the outer socket. A plurality of elongate cable strands extend through the socket interior with individual strands circumferentially spaced to form a single layer of strands at the base opening. A frustoconical inner plug is inserted into the socket by a compressive force exceeding a maximum tensile force of the stranded cable for holding the cable in the socket without slippage when a tensile force is applied between the cable and the outer socket. The inner plug includes a plurality of longitudinally extending, laterally separate plug subassemblies.

13 Claims, 6 Drawing Sheets

CABLE TERMINATION METHOD AND APPARATUS

GOVERNMENT SUPPORT

This invention was made with government support under U.S. Government Contract Number B14-2013308G001 awarded by the Department of Defense. The government has certain rights in the invention.

TECHNICAL FIELD

This disclosure relates to a cable termination apparatus and method for terminating a cable, and, more particularly, to a cable termination apparatus and method for selective attachment to a cable comprising a plurality of longitudinally extending cable strands.

BACKGROUND

Multi-stranded cables, especially in underwater or other not-readily-accessible locations, often need to have an end termination which allows for operative connection (e.g., electrical, Internet, fiber optic, or any other type) to another cable or piece of equipment. Thus, end connectors are provided between the (potentially very long) body of the cable and the end equipment, to assist with connections and maintenance. End connectors are often expensive to obtain and install, and it is often desirable to maintain the connection between the end equipment and the cable intact, without damage to either component.

In the past, a clamp or high strength epoxy or polyester resin has been used to hold the end connector to the cable. However, these arrangements are subject to slippage when high tensile forces are applied. Particularly for the resin coupling, additional installation time and effort must be expended to inject the resin into the end connector, bleed out any trapped air, and allow the resin to cure.

Another proposed cable termination solution involves a cone and socket type strength or armor wire termination having a hole just large enough to accept an outer diameter of the stranded cable. However, often the termination of the cable (e.g., a remotely operated vehicle ["ROV"] umbilical, or strength wires of unmanned underwater vehicle ["UUV"] tow cable) needs to be repaired, which necessitates removal of the operative end connector. Thus, any (larger-diameter) end equipment will have to be cut off—because it does not fit through the hole in the cone and socket—during cable termination maintenance work.

This complete severing of the cable is undesirable in many applications. For example, the center core of an ROV umbilical cable usually contains many strands of optical fiber, power cable, and small gauge control wire. Having to sever the central core of a cable to repair merely-external damage is costly and time-consuming, if even possible.

SUMMARY

In an embodiment, a cable termination apparatus for selective attachment to a cable comprising a plurality of longitudinally extending cable strands is disclosed. A first socket piece includes a longitudinally extending, laterally concave first inner arc face laterally spaced from a first outer arc face by a first socket body. The first socket body has at least one longitudinally extending first socket joint feature. A second socket piece includes a longitudinally extending, laterally concave second inner arc face laterally spaced from a second outer arc face by a second socket body. The second socket body has at least one longitudinally extending second socket joint feature. The first and second socket pieces are configured for selective mutual connection via the first and second socket joint features to collectively form a substantially cylindrical outer socket defining a central longitudinal axis and having longitudinally spaced and oppositely facing proximal and distal socket faces. The outer socket includes a center bore collectively formed by the first and second inner arc faces. The center bore extends longitudinally between the proximal and distal socket faces. The center bore is tapered to have a larger lateral cross-section at the distal socket face than at the proximal socket face. A frustoconical inner plug includes a plurality of longitudinally extending, laterally separate plug subassemblies. The inner plug includes an outer plug surface extending longitudinally between longitudinally spaced and oppositely facing proximal and distal plug faces. The inner plug is tapered to have a smaller lateral cross-section at the distal plug face than at the proximal plug face. When the cable termination apparatus is attached to the cable, at least a portion of the plurality of cable strands are located laterally between the center bore and the outer plug surface. Tensile force exerted on the cable termination apparatus by the cable strands wedges the inner plug into the center bore.

In an embodiment, a method of terminating a cable comprising a plurality of longitudinally extending cable strands is disclosed. A cable termination apparatus is provided. The cable termination apparatus includes a first socket piece including a longitudinally extending, laterally concave first inner arc face laterally spaced from a first outer arc face by a first socket body. The first socket body has at least one longitudinally extending first socket joint feature. A second socket piece includes a longitudinally extending, laterally concave second inner arc face laterally spaced from a second outer arc face by a second socket body. The second socket body has at least one longitudinally extending second socket joint feature. A frustoconical inner plug includes a plurality of longitudinally extending, laterally separate plug subassemblies. The inner plug includes an outer plug surface extending longitudinally between longitudinally spaced and oppositely facing proximal and distal plug faces. The inner plug is tapered to have a larger lateral cross-section at the distal plug face than at the proximal plug face. The first and second socket pieces are mutually connected via the first and second socket joint features to collectively form a substantially cylindrical outer socket defining a central longitudinal axis and having longitudinally spaced and oppositely facing proximal and distal socket faces. The outer socket includes a center bore collectively formed by the first and second inner arc faces. The center bore extends longitudinally between the proximal and distal socket faces. The center bore is tapered to have a larger lateral cross-section at the distal socket face than at the proximal socket face. The cable termination apparatus is attached to the cable with at least a portion of the plurality of cable strands being located laterally between the center bore and the outer plug surface. Tensile force is exerted on the cable termination apparatus with the cable strands to wedge the inner plug into the center bore.

In an embodiment, a cable termination system is disclosed. An outer socket has a frustum shaped socket interior tapering from a base to a top opening. The outer socket is comprised of two semicircular socket pieces, each forming a portion of a complete circumference of the outer socket. A plurality of elongate cable strands extend through the socket interior with individual strands circumferentially spaced to form a single layer of strands at the base opening. A frustoconical inner plug is inserted into the socket by a compressive force exceeding a maximum tensile force of the stranded cable for holding the cable in the socket without slippage when a tensile force is applied between the cable and the outer socket. The inner plug includes a plurality of longitudinally extending, laterally separate plug subassemblies.

BRIEF DESCRIPTION OF THE DRAWINGS

For a better understanding, reference may be made to the accompanying drawings, in which.

DESCRIPTION OF ASPECTS OF THE DISCLOSURE

This technology comprises, consists of, or consists essentially of the following features, in any combination.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "directly adjacent" another feature may have portions that overlap or underlie the adjacent feature, whereas a structure or feature that is disposed "adjacent" another feature may not have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

Figure 1:
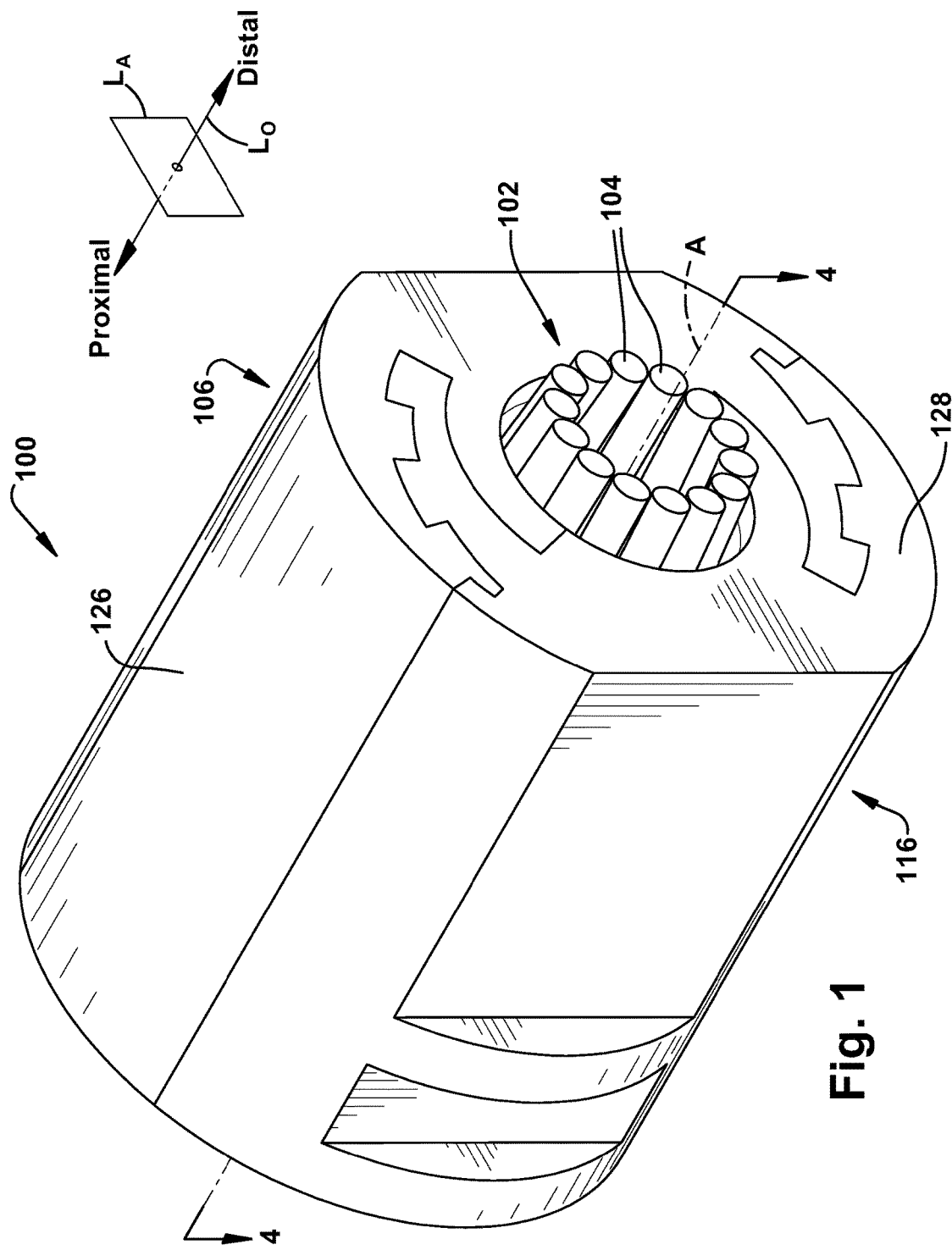
FIG. 1 is a perspective front view of one aspect of the invention.
Figure 2:
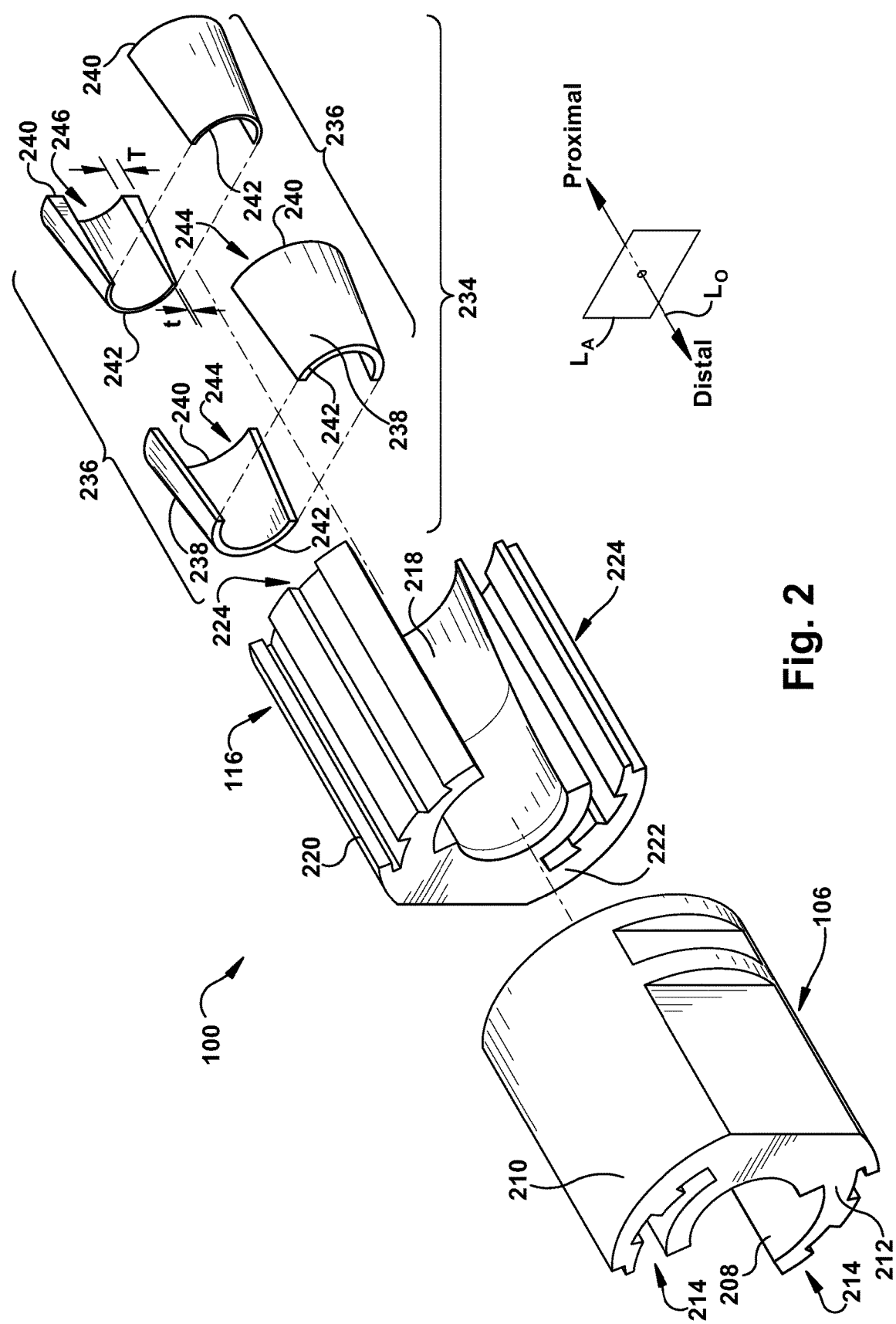
FIG. 2 is an exploded perspective view of the aspect of FIG. 1.

FIGS. 1-2 depict a cable termination apparatus 100 and system for selective attachment to a cable 102 comprising a plurality of longitudinally extending cable strands 104. The longitudinal direction is shown at $L_O$ in FIG. 1, angled into and out of the plane of the page, in that view. A first socket piece 106 includes a longitudinally extending, laterally concave first inner arc face 208 laterally spaced from a first outer arc face 210 by a first socket body 212. The "lateral" direction ($L_A$) in the Figures is defined in a plane substantially perpendicular to the longitudinal direction. The first socket body 212 has at least one longitudinally extending first socket joint feature 214 (two shown in FIG. 2).

A second socket piece 116 includes a longitudinally extending, laterally concave second inner arc face 218 laterally spaced from a second outer arc face 220 by a second socket body 222. The second socket body 222 has at least one longitudinally extending second socket joint feature 224 (two shown in FIG. 2).

The first and second socket pieces 106 and 116 are configured for selective mutual connection via the first and second socket joint features 214 and 224, as will be discussed below. This mutual connection of the first and second socket pieces 106 and 116 collectively forms a substantially cylindrical outer socket 126 defining a central longitudinal axis A and having longitudinally spaced and oppositely facing proximal and distal socket faces (the distal socket face is shown at 128 in FIG. 1, and the opposite proximal socket face is hidden from view in that Figure but shown at 330 in FIG. 3).

Figure 3:
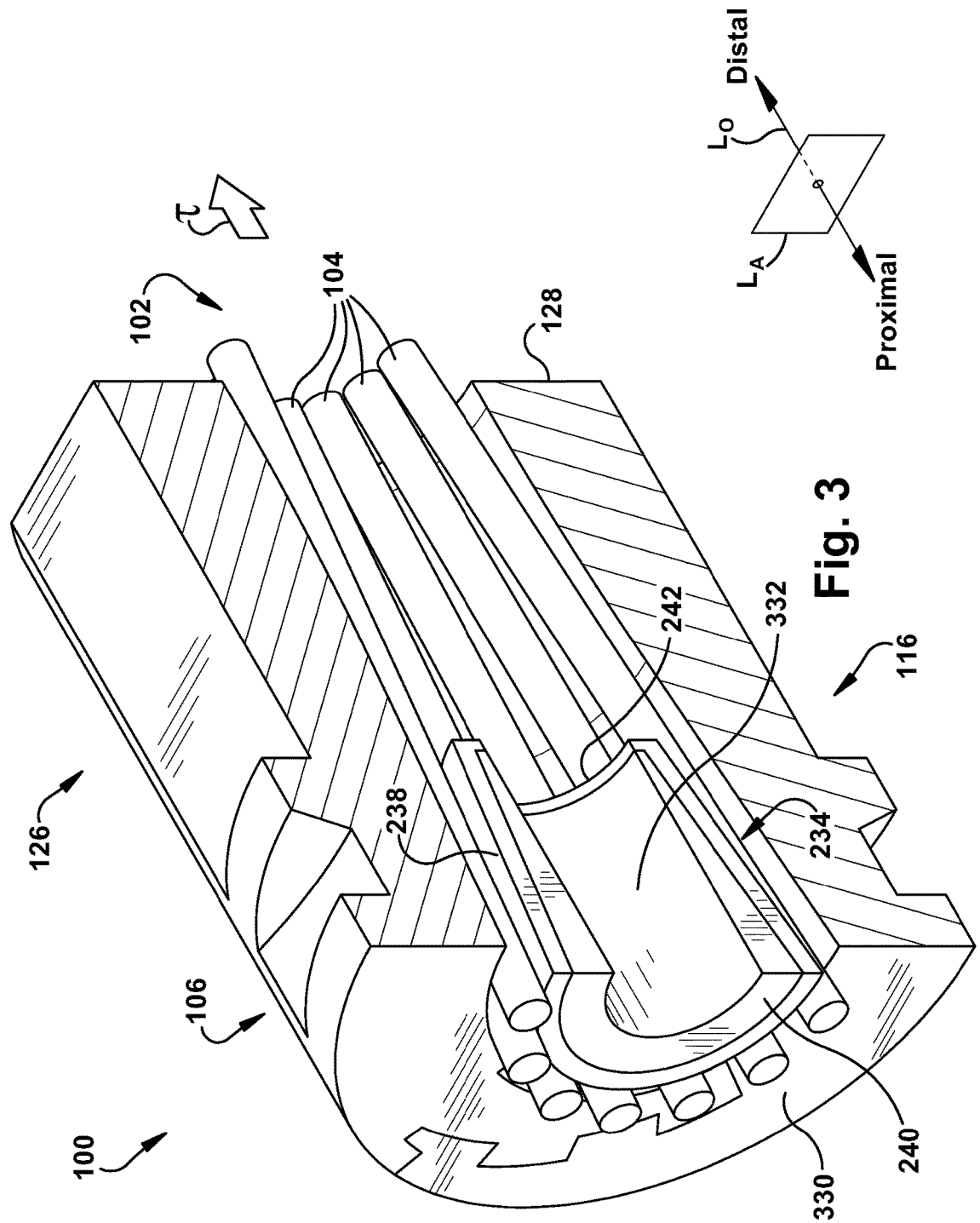
FIG. 3 is a sectional perspective side view of the aspect of FIG. 1.

With reference to FIG. 3, the outer socket 126 includes a center bore 332 collectively formed by the first and second inner arc faces 208 and 218. The center bore 332 extends longitudinally between the proximal and distal socket faces 330 and 128, respectively. The center bore 130 is tapered to have a smaller lateral cross-section at the distal socket face 128 than at the proximal socket face 330.

A frustoconical inner plug 234 includes a plurality of longitudinally extending, laterally separate plug subassemblies 236 (two shown). The inner plug 234 includes an outer plug surface 238 extending longitudinally between longitudinally spaced and oppositely facing proximal and distal plug faces 240 and 242, respectively, formed collectively by the components of the inner plug 234. The inner plug 234 may be tapered to have a larger lateral cross-section at the distal plug face 242 than at the proximal plug face 240. The plug subassemblies 236 are laterally separate, but can be brought together to collectively form a full 360° circumference (in a lateral plane) of the frustoconical inner plug 234 shape.

Optionally, and as shown in FIG. 2, each of the inner plug subassemblies 236 may include a substantially malleable outer skin 244 and a substantially rigid plug core 246. (It is also contemplated that the inner plug 234 may be a resin plug [not shown], cured in place.) When present, the substantially malleable outer skin 244 may help cushion the cable strands 104 from pinching or crushing under outwardly directed force exerted by the inner plug 234. As shown, the outer skins 244 and plug cores 246 of the plug subassemblies 236 collectively form the entire inner plug 234 structure, including the full 360° circumference (in a lateral plane) of the frustoconical inner plug 234 shape.

Though the plug cores 246 are shown as having a substantially C-shaped cross-section in the lateral plane (i.e., maintaining the patency of the center bore 332), it is contemplated that the plug cores 246 may have any desirable cross-section in the lateral plane, including one which substantially obstructs or fills the center bore 332.

As shown schematically in FIG. 2 (which, like all Figures, is not to scale), the outer skin 244 may have a substantially constant thickness, and the plug core 246 may be tapered to be laterally thicker at the proximal plug face 240 (e.g., thickness "T") than at the distal plug face 242 (e.g., thickness "t"). Alternatively, though omitted from the Figures, the outer skin 244 may be tapered, whether or not the plug core 246 is a substantially constant thickness. In any desired manner, therefore, one of ordinary skill in the art could configure the inner plug 234 components to provide a relatively constant-diameter center bore 332 or to provide a converging or diverging inner bore arrangement (not shown), as desired for a particular use environment.

Figure 4:
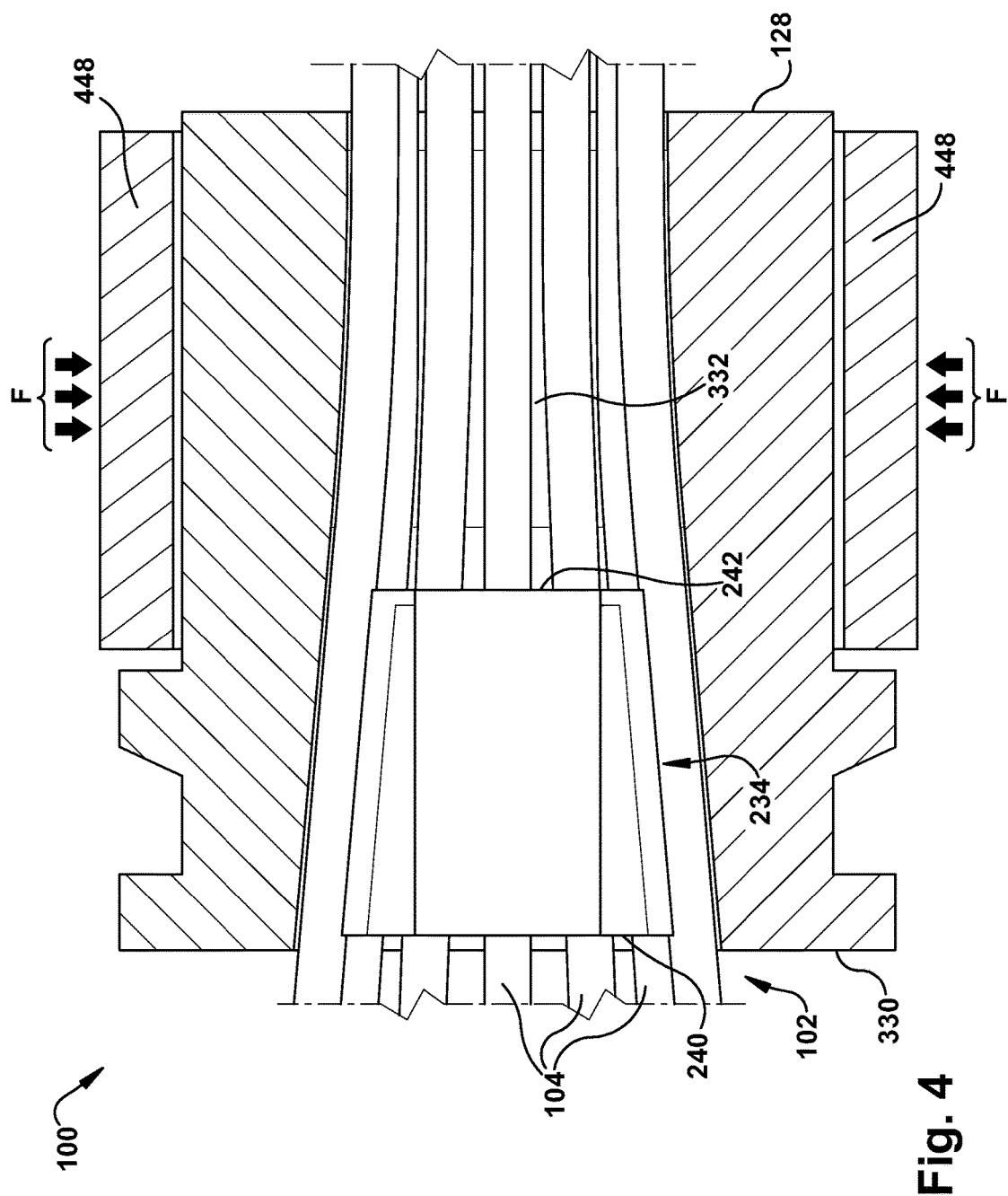
FIG. 4 is a sectional side view of the aspect of FIG. 1.

Optionally, and as shown schematically in FIG. 4, an outer sleeve 448 may substantially laterally surround the outer socket 126 (e.g., around the outer circumference of the cable termination apparatus 100) and be configured to exert a laterally compressive force F on the outer socket 126, such as to help maintain the multiple-piece outer socket 126 around the cable 102. The outer sleeve 448, when present, may be of any suitable material or configuration, and may be placed around the outer socket 126 in any desired manner. For example, the outer sleeve 448 may be a resilient (e.g., elastomeric) continuous circular band that is stretched around the outer socket 126. As another example, the outer sleeve 448 may be a relatively non-elastic strip which is wrapped around the outer socket 126 and fastened there (e.g., a hose clamp) in any suitable manner, such as via adhesives or small screws or rivets (not shown).

Figure 5:
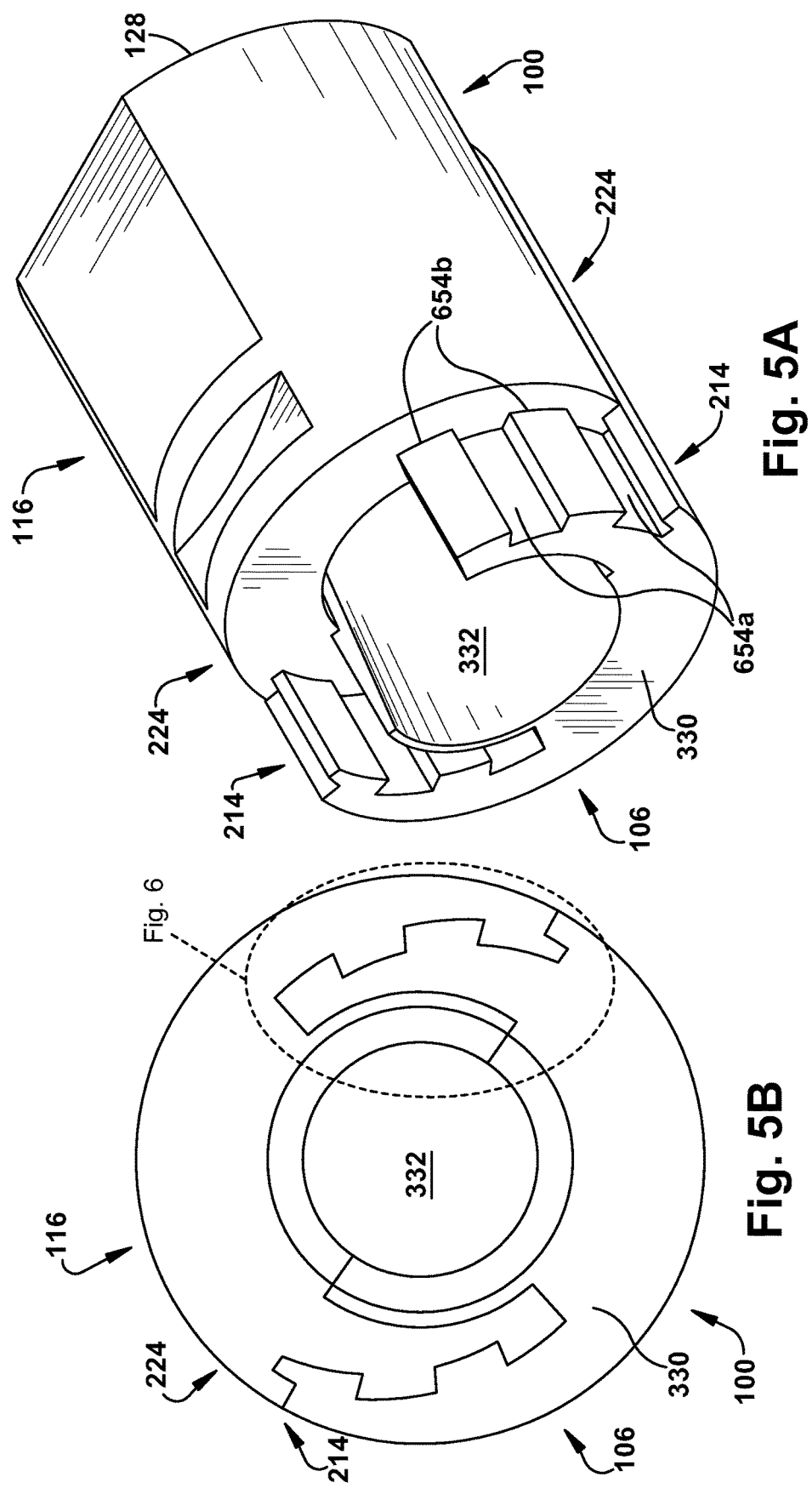
FIG. 5A is a partial perspective side view of the aspect of FIG. 1.
FIG. 5B is a partial front view of the aspect of FIG. 1.
Figure 6:
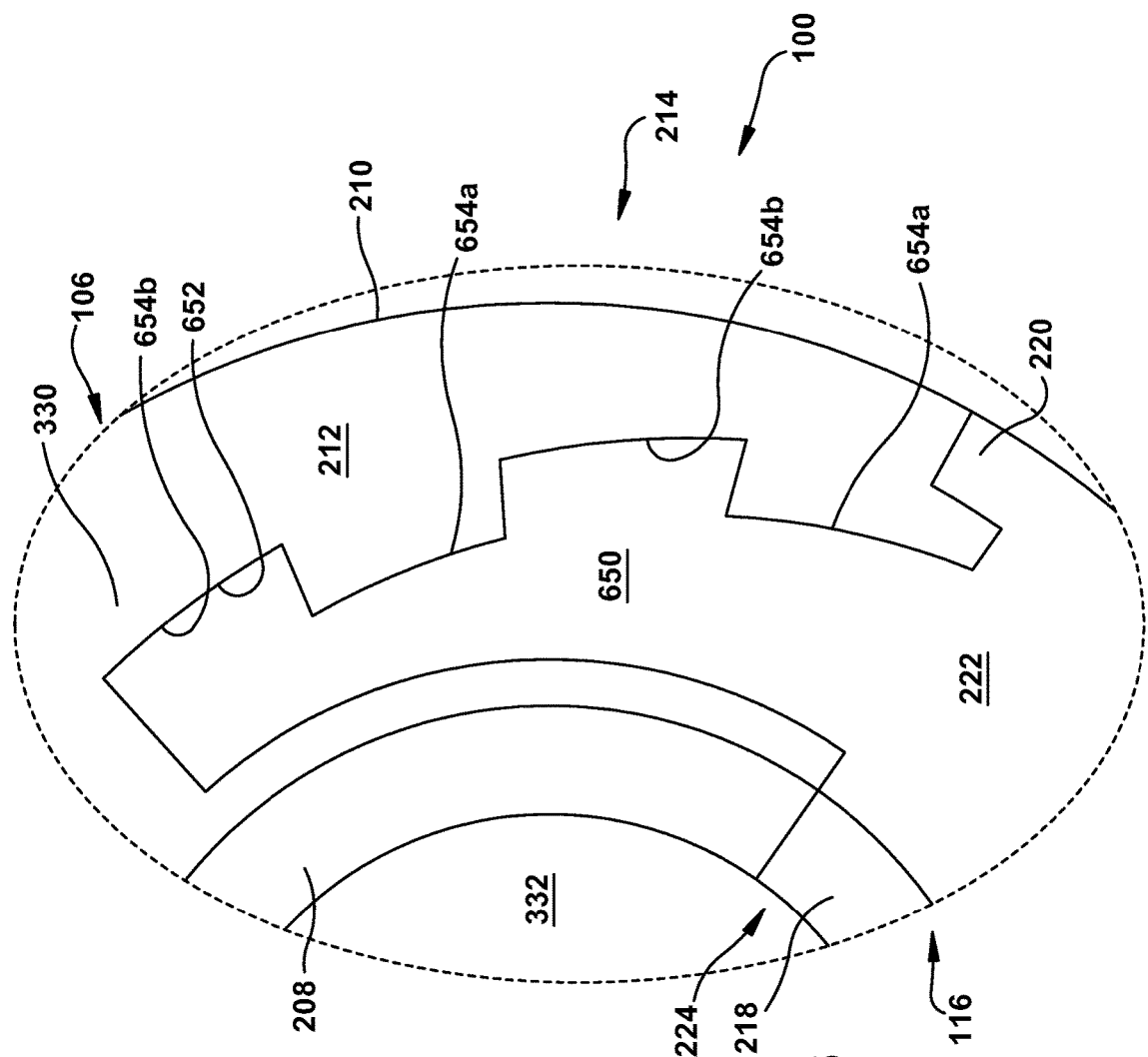
FIG. 6 is a detail taken at "6" in FIG. 5B.

Turning now to FIGS. 5A-6, the first and second socket pieces 106 and 116 may be substantially identically structured, which may provide desired manufacturing, inventory, and maintenance properties. For example, if the first and second socket pieces 106 and 116 are molded, only one mold style is required when the same distinct part, rotated 180° to provide the different orientations shown, is used as both the first and second socket pieces 106 and 116. As shown in the sequence from FIG. 5A-5B, the first and second socket pieces 106, 116 may be placed into selective mutual connection via longitudinally oriented sliding motion relative to one another. Stated differently, the first and second socket pieces 106, 116 may be aligned as shown in FIG. 5A, but with a longitudinal offset. The first and second socket joint features 214 and 224 are aligned for engagement in any desired manner, and then the first and second socket pieces 106 and 116 are slid longitudinally to interlock the first and second socket joint features 214 and 224 and thereby form the outer socket 126.

Optionally, and as shown in the Figures, a selected protruding one of the first and second socket joint features 214 and 224 includes a tenon 650 extending circumferentially beyond a circumferential extent of the corresponding first or second inner arc face 208 and 218, and a selected recessed one of the first and second socket joint features 214 and 224 includes a mortise 652 in the corresponding first or second socket body 212 and 222, the mortise 652 extending circumferentially into the corresponding first or second socket body 212 and 222 laterally between the first or second inner arc face 208 and 218 and the first or second outer arc face 210 and 220. The mortise 652 is configured to substantially accept the tenon 650 in a dovetail relationship, as shown in the detail view of FIG. 6, when the outer socket 126 is formed from the first and second socket pieces 106 and 116.

Particularly when the first and second socket pieces 106 and 116 are substantially identical, as shown in the Figures, each of the first and second socket pieces 106 and 116 may include a tenon 650 circumferentially spaced from a mortise 652, as can be seen in especially FIGS. 5A-5B.

The mortise 652 and tenon 650 may be both complexly configured with one or more longitudinally extending, circumferentially spaced grooves 654, the grooves 654a of the tenon 650 and the grooves 654b of the mortise 652 being mutually configured for selective interconnected engagement. This labyrinthine arrangement, as shown in the detail view of FIG. 6, may be configured to provide desired stress distribution properties for a particular use environment, and may be as complex or as simple as desired by one of ordinary skill in the art.

When the cable termination apparatus 100 is attached to the cable 102, at least a portion of the plurality of cable strands 104 are located laterally between the center bore 332 and the outer plug surface 238, as shown in FIGS. 3-4. The depicted arrangement may be arrived at, for example, by placing the first and second socket pieces 106 and 116 about an outer circumference of the entire bundle of cable strands 104 in a clamshell-type manner and joining them together, such as will be discussed below. The inner plug 234 may then be placed (e.g., assembled in a clamshell-type manner) inside the "circle" formed by the bundle of cable strands 104, proximal to the proximal socket face 330. Then, the inner plug 234 may be slid distally into the depicted position of FIG. 3 to "pinch" or "wedge" the cable strands 104 laterally between the outer plug surface 238 and one of the first and second inner arc faces 208 and 218. The center core (not shown) of the cable 102 can thus become circumferentially surrounded by the cable termination apparatus 100 and extend through the center bore 130 thereof, through the "side-loading" provided by the laterally split cable termination apparatus 100. Accordingly, severing of the cable for threading through an end of an unbroken toroidal prior art cable termination device can be avoided.

The cable strands 104 may be relatively evenly spaced about a circumference of the outer plug surface 238 as shown, or may be grouped or bunched together, in either a predetermined manner or by happenstance during placement of the inner plug 234 into the center bore 332. Optionally, a strand guide (not shown), which could be a "fluted" or grooved outer plug surface 238, may be provided to help arrange the cable strands 104 around the inner plug 234 as desired. Regardless of how the FIGS. 3-4 configuration is achieved, however, during installation and use of the cable termination apparatus 100, tensile force τ exerted on the cable termination apparatus 100 by the cable strands 104 wedges the inner plug 234 into the center bore 332, such as by exerting frictional force on the outer plug surface 238 to pull the inner plug 234 toward the distal socket face 128.

Stated differently, the cable termination apparatus 100 as shown in the Figures (with special reference to FIGS. 3-4) could be part of a cable termination system, including an outer socket 126 having a frustum shaped socket interior 332 tapering from a base 330 to a top 128 opening, the outer socket 128 being comprised of two semicircular socket pieces 106, 116 each forming a portion of a complete circumference of the outer socket 126. A plurality of elongate cable strands 104 extend through the socket interior 332. A frustoconical inner plug 234 is inserted into the socket 126 by a compressive force exceeding a maximum tensile force of the stranded cable 102 for holding the cable 102 in the socket without slippage when a tensile force is applied between the cable 102 and the outer socket 126, the inner plug 234 including a plurality of longitudinally extending, laterally separate plug subassemblies 236.

The cable termination apparatus 100 may have any desired dimensions and materials and may be configured for a particular use environment by one of ordinary skill in the art. For example, for a ¾-inch cable 102, the outer socket 126 may measure about 2 inches long (in the transverse direction) and about 2 inches in diameter (in the lateral plane). The cable termination apparatus 100, and components thereof, may be made in any suitable manner and from any suitable materials. For example, at least the outer socket 126 may be at least partially formed from 174PH high strength stainless steel for corrosion-resistance in a seawater use environment. Particularly if the mortise 652 and tenon 650 include complex/labyrinthine profiles such as those shown in the Figures, an additive manufacturing process ("3D printing") such as, but not limited to, wire EDM may be used to achieve the depicted contours and profiles, especially in a situation in which manufacturing tolerances are relatively tight.

Though only a portion of the cable 102 is shown in the Figures, the fracture lines in certain Figures (omitted from others of the Figures for clarity) express that the cable 102 extends some distance to either side of the cable termination apparatus 100. For many use applications of the cable termination apparatus 100, the cable 102 will extend a potentially very large distance toward the distal direction, especially if an end connector (not shown) is located a much smaller distance away from, and on a proximal side of, the cable termination apparatus 100.

It is contemplated that lugs, ears, flats, or other features (not shown) may be provided to assist with connecting the cable termination apparatus 100 to the cable 102 or to any other adjacent structures.

While, for most use environments, the individual strands 104 extending through the socket interior 332 will be circumferentially spaced to form a single layer of strands 104 at the base 330 opening, it is also contemplated that individual strands 104 could cross over each other (e.g., laterally overlie one another) within parts of the cable termination apparatus 100. Other structures (e.g., the inner plug 234) could be configured to accommodate multiple "layers" of strands 104 if the depicted single layer is omitted from a particular use environment.

It is also contemplated that the strands 104 used with a single cable termination apparatus 100 could have differing thicknesses/diameters. In such case, malleability of the inner plug 234 (or portions thereof) could compensate for any such thickness mismatches in the layer of strands 104.

While aspects of this disclosure have been particularly shown and described with reference to the example embodiments above, it will be understood by those of ordinary skill in the art that various additional embodiments may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking aiding a user in selecting one component from an array of similar components for a particular use environment. A "predetermined" status may be determined at any time before the structures being manipulated actually reach that status, the "predetermination" being made as late as immediately before the structure achieves the predetermined status. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one embodiment or configuration could be provided, singly or in combination with other structures or features, to any other embodiment or configuration, as it would be impractical to describe each of the embodiments and configurations discussed herein as having all of the options discussed with respect to all of the other embodiments and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. A cable termination apparatus for selective attachment to a cable comprising a plurality of longitudinally extending cable strands, the apparatus comprising:
   a first socket piece including a longitudinally extending, laterally concave first inner arc face laterally spaced from a first outer arc face by a first socket body, the first socket body having at least one longitudinally extending first socket joint feature;
   a second socket piece including a longitudinally extending, laterally concave second inner arc face laterally spaced from a second outer arc face by a second socket body, the second socket body having at least one longitudinally extending second socket joint feature;
   the first and second socket pieces being configured for selective mutual connection via the first and second socket joint features to collectively form a substantially cylindrical outer socket defining a central longitudinal axis and having longitudinally spaced and oppositely facing proximal and distal socket faces, the outer socket including a center bore collectively formed by the first and second inner arc faces, the center bore extending longitudinally between the proximal and distal socket faces, the center bore being tapered to have a larger lateral cross-section at the distal socket face than at the proximal socket face, a selected protruding one of the first and second socket joint features including a tenon circumferentially beyond a circumferential extent of the corresponding first or second inner arc face, and a selected recessed one of the first and second socket joint features including a mortise in the corresponding first or second socket body, the mortise extending circumferentially into the corresponding first or second socket body laterally between the first or second inner arc face and the first or second outer arc face, the mortise being configured to substantially accept the tenon in a dovetail relationship when the outer socket is formed from the first and second socket pieces; and
   a frustoconical inner plug including a plurality of longitudinally extending, laterally separate plug subassemblies, the inner plug including an outer plug surface extending longitudinally between longitudinally spaced and oppositely facing proximal and distal plug faces, the inner plug being tapered to have a smaller lateral cross-section at the distal plug face than at the proximal plug face; wherein when the cable termination apparatus is attached to the cable, at least a portion of the plurality of cable strands are located laterally between the center bore and the outer plug surface; and wherein tensile force exerted on the cable termination apparatus by the cable strands wedges the inner plug into the center bore.

2. The cable termination apparatus of claim 1, wherein the first and second socket pieces are substantially identically structured.

3. The cable termination apparatus of claim 1, wherein the first and second socket pieces are placed into selective mutual connection via longitudinally oriented sliding motion relative to one another.

4. The cable termination apparatus of claim 1, wherein each of the first and second socket pieces includes a tenon circumferentially spaced from a mortise.

5. The cable termination apparatus of claim 1, wherein the mortise and tenon are both complexly configured with one or more longitudinally extending, circumferentially spaced grooves, the grooves of the tenon and the grooves of the mortise being mutually configured for selective interconnected engagement.

6. The cable termination apparatus of claim 1, including an outer sleeve substantially laterally surrounding the outer socket and configured to exert a laterally compressive force thereon.

7. The cable termination apparatus of claim 1, wherein each of the inner plug subassemblies includes a substantially malleable outer skin and a substantially rigid plug core.

8. The cable termination apparatus of claim 7, wherein the outer skin has a substantially constant thickness, and the plug core is tapered to be laterally thicker at the proximal plug face than at the distal plug face.

9. A method of terminating a cable comprising a plurality of longitudinally extending cable strands, the method comprising:

providing a cable termination apparatus including:
 a first socket piece including a longitudinally extending, laterally concave first inner arc face laterally spaced from a first outer arc face by a first socket body, the first socket body having at least one longitudinally extending first socket joint feature,
 a second socket piece including a longitudinally extending, laterally concave second inner arc face laterally spaced from a second outer arc face by a second socket body, the second socket body having at least one longitudinally extending second socket joint feature, and
 a frustoconical inner plug including a plurality of longitudinally extending, laterally separate plug subassemblies, the inner plug including an outer plug surface extending longitudinally between longitudinally spaced and oppositely facing proximal and distal plug faces, the inner plug being tapered to have a larger lateral cross-section at the distal plug face than at the proximal plug face;

mutually connecting the first and second socket pieces via the first and second socket joint features, by moving them in a longitudinally oriented sliding motion relative to one another, to collectively form a substantially cylindrical outer socket defining a central longitudinal axis and having longitudinally spaced and oppositely facing proximal and distal socket faces, the outer socket including a center bore collectively formed by the first and second inner arc faces, the center bore extending longitudinally between the proximal and distal socket faces, the center bore being tapered to have a larger lateral cross-section at the distal socket face than at the proximal socket face;

attaching the cable termination apparatus to the cable with at least a portion of the plurality of cable strands being located laterally between the center bore and the outer plug surface; and exerting tensile force on the cable termination apparatus with the cable strands to wedge the inner plug into the center bore.

10. The method of claim 9, wherein mutually connecting the first and second socket pieces includes mating a tenon included in a selected protruding one of the first and second socket joint features with a mortise included in a selected recessed one of the first and second socket joint features in a dovetail relationship.

11. The method of claim 10, wherein the mortise and tenon are both complexly configured with one or more longitudinally extending, circumferentially spaced grooves, the grooves of the tenon and the grooves of the mortise being mutually configured for selective interconnected engagement.

12. The method of claim 9, wherein providing a cable termination apparatus includes providing each of the inner plug subassemblies with a substantially malleable outer skin and a substantially rigid plug core.

13. The method of claim 12, wherein the outer skin has a substantially constant thickness, and the plug core is tapered to be laterally thicker at the proximal plug face than at the distal plug face.

* * * * *